July 13, 1965 M. WIENAND 3,193,873
DEVICE FOR THE CONTINUOUS SIMULTANEOUS TRANSVERSE AND
LONGITUDINAL DRAWING OF THERMOPLASTIC STRIPS
Filed Oct. 19, 1961 2 Sheets-Sheet 1

INVENTOR
MICHAEL WIENAND

BY
ATTORNEYS

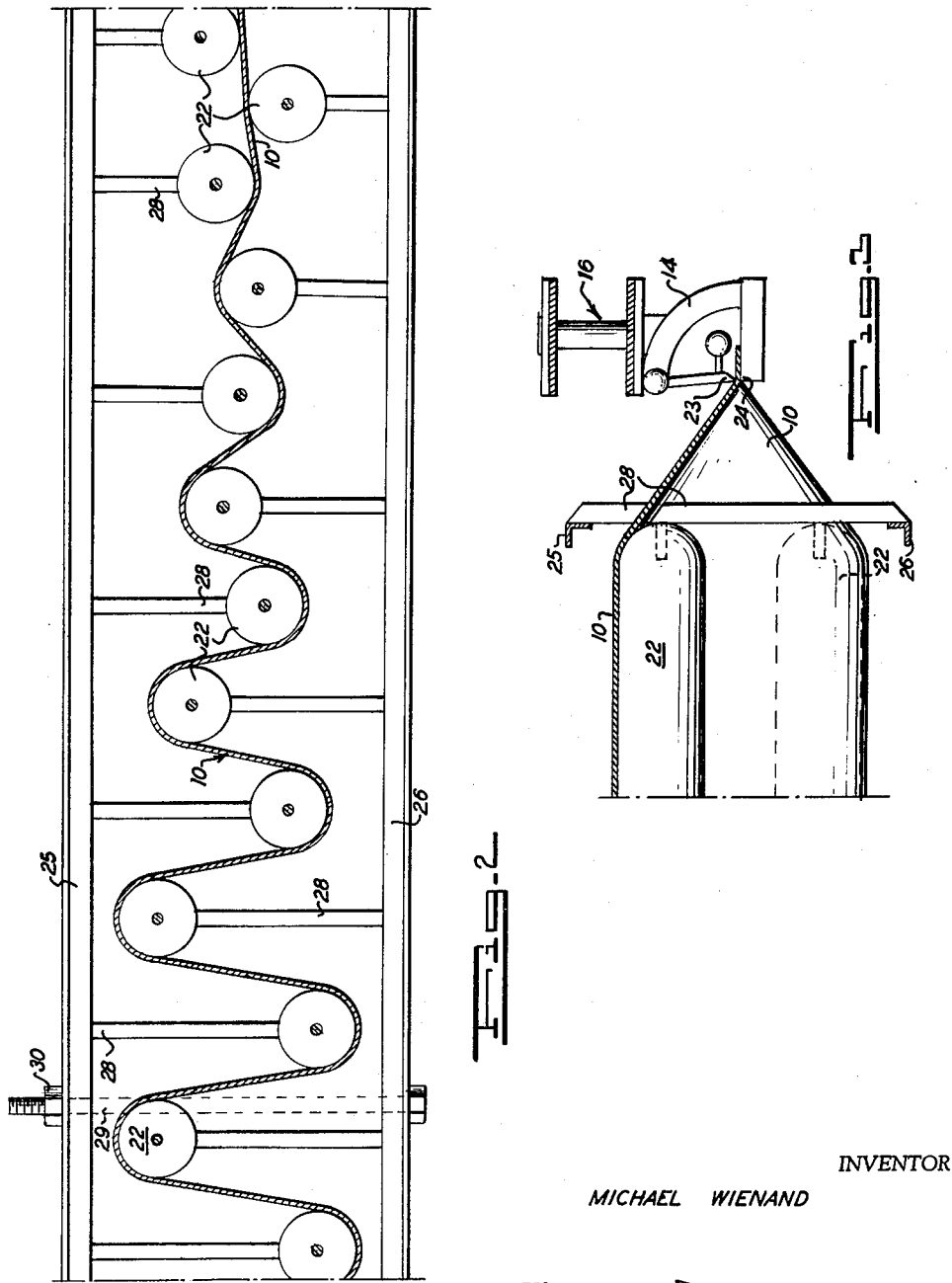

United States Patent Office 3,193,873
Patented July 13, 1965

3,193,873
DEVICE FOR THE CONTINUOUS SIMULTANE-
OUS TRANSVERSE AND LONGITUDINAL
DRAWING OF THERMOPLASTIC STRIPS
Michael Wienand, Siegburg, Germany, assignor to Dyna-
mit Nobel A.G., Troisdorf, Bezirk Cologne, Germany,
a corporation of Germany
Filed Oct. 19, 1961, Ser. No. 146,139
Claims priority, application Germany, Dec. 24, 1960,
D 35,038
9 Claims. (Cl. 18—1)

This invention relates to an apparatus for the continuous, simultaneous, transverse and longitudinal drawing of strips of thermoplastic material.

It has been found that mechanical properties of thermoplastic articles are greatly improved by drawing or stretching in longitudinal and transverse directions. Among such plastic materials may be mentioned polyamides, high-polymer, polyolefins and polymethylenterephthalates and polystyrol. Sheets of such material have been treated in this way but it has been found difficult to continuous draw out webs of material to stretch them longitudinally and simultaneously stretch them transversely.

It is, accordingly, and object of this invention to simultaneously and continuously stretch a web of this character longitudinally and transversely, and to provide apparatus for performing such functions which will be easily operated, simple to construct and effective.

Other objects of the invention will be in part pointed out and in part obvious from the following description of the invention taken in conjunction with the drawing of which:

FIG. 2 is a vertical section along the line 2—2 of FIG. 1 looking in the direction of the arrows, and FIG. 3 is a vertical cross section taken along the line 3—3 of FIG. 1 looking in the direction of the arrows.

Figure 1:
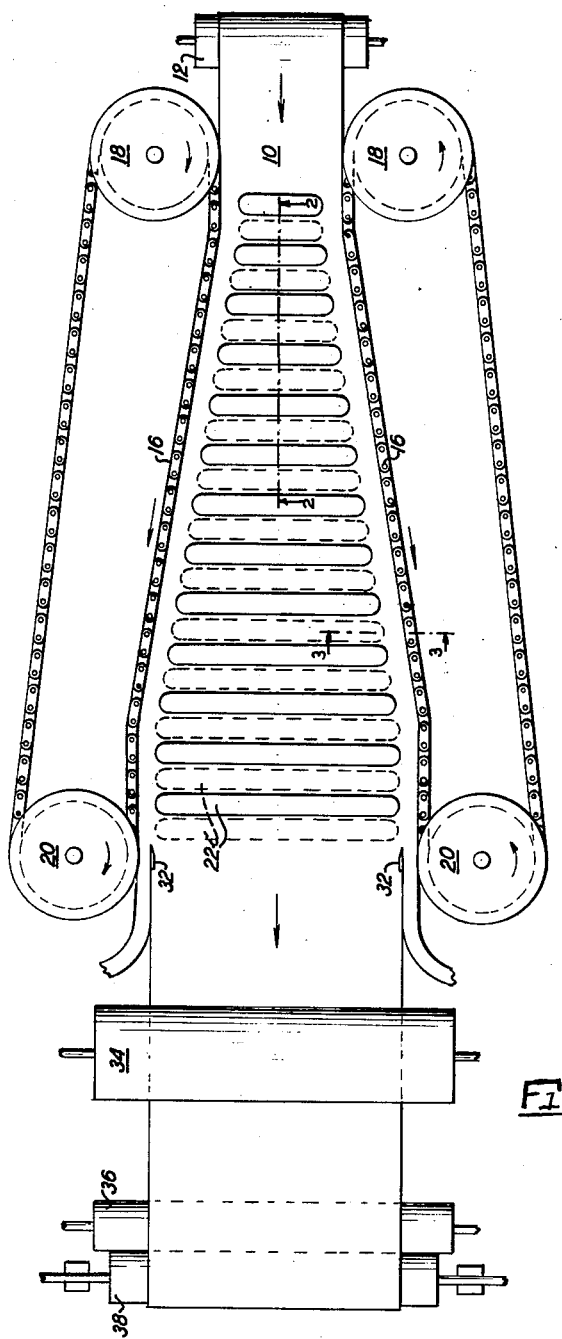
FIG. 1 is a diagrammatic plan view of apparatus for carrying out the invention.

Referring to the drawing, a strip 10 of suitable thermoplastic material is fed from a roller 12 into position between clamps 14 carried upon an endless chain 16 guided about pulleys 18 and 20. There are two such chains 16 and pairs of guiding pulleys 18 and 20, one on either side of thermoplastic strip 10. Each clamping device 14 is provided with suitable jaws 23 and 24 which grip the edges of strip 10. While jaw 24 of each clamping device 14 is stationary, the corresponding jaw 23 is pivotally suspended from the top end of device 14 and may be pivotally displaced from the position shown in FIG. 3 in a direction away from the medial portion of strip 10 to release the edge of the strip at the completion of the stretching, as for instance by positioning a guide bar (not shown) in the path of such jaws 23 to guide them in the desired pivotal direction out of gripping contact with the strip edge. On the other hand, initial gripping contact is made with the strip at the beginning of the stretching by positioning a similar guide bar (not shown) in the path of such jaws 23 to guide them in the desired pivotal direction. The tension of strip 10 positioned in the opposing clamping devices 14 will keep the jaws 23 in gripping engagement with the corresponding strip edge against the coacting jaws 24. As indicated in FIG. 1, chains 16 diverge as they approach pulleys 20 thereby widening strip 10 to a suitable degree.

Means is provided to elongate strip 10 in such a way that the web is not pulled lengthwise out of clamps 14 on chains 16. Such means includes a set of rollers 22 for pulling strip 10 in a direction transverse to the direction of feed and of widening. A plurality of such rollers 22 are provided rotatably mounted on posts 28 carried by upper and lower frames 25 and 26 respectively. Rollers 22 are so disposed with respect to each other that as web 10 passes alternately under and over the rollers successively the deflection in a vertical direction increases. The web 10 is thus progressively stretched longitudinally at the control part contacting the rollers, while at the clamped edges no longitudinal stretch occurs.

As shown in FIG. 2 posts 28 are alternately supported by frames 25 and 26 so that that vertical adjustment of rollers 22 with respect to each other is effected by changing the angularity of the frames with respect to each other. An adjusting screw 29 and lock nut 30 are provided for this purpose, passing through both frames.

In the vicinity of the last roller 22, slitters 32 are mounted to sever the unlengthened side edges. The remainder of web 10 passes to a pair of rollers 34 and is cooled, being finally passed over a roller 36 and wound into a coil 38.

As an example the operation of the apparatus as applied to a high-polymer polymethylene terephthalate sheet is cited. A strip of polyterephthalic acid-glycol-ester 100 m$\mu$ thickness and 300 mm. width produced by extrusion from a wide slot nozzle was introduced into the clamp frame consisting of the clamps 14 and heated. The strip in the clamp frame was conducted over a distance of 1000 mm. continuous feed and drawn by clamps 14 and chains 16 to a final width of 900 mm. while simultaneously being passed over rollers 22 of 30 mm. diameter as in FIG. 2 with continuously increasing vertical distances of from zero to a final distance of 73 mm. between the strip and the outer roller diameter. The strip was drawn in both directions by 300%. Subsequently the strip was cooled by the roller 34 to solidify. Finally, the strip had a thickness of 10 m$\mu$ and the mechanical properties of the strip were very considerably improved.

I claim:

1. Apparatus for treating a plastic strip which comprises means to feed said strip continuously along a path of travel, lengthening means positioned along said path of travel to lengthen said strip by stretching said strip continuously in a direction out of its normal plane, and separate widening means positioned along said same path of travel at least in part coextensively with said lengthening means and operative simultaneously with said lengthening means to widen said strip simultaneously with the lengthening thereof during the feeding of said strip continuously along said path of travel.

2. Apparatus as set forth in claim 1 in which said lengthening means acts in a direction transverse to said feed.

3. Apparatus as set forth in claim 1 in which said lengthening means consists of a plurality of pulling elements for engaging said strip, arranged alternately above and below the level of said widening means.

4. Apparatus as set forth in claim 3 in which the vertical spacing of said pulling elements is progressively increased in the direction of strip stretching.

5. Apparatus as set forth in claim 3 in which said pulling elements are a succession of rollers of increasing length in the direction of strip feed.

6. Apparatus as set forth in claim 3 in which said pulling elements are rollers mounted adjustably to vary their vertical separation.

7. Apparatus as set forth in claim 1 in which said widening means includes clamp frames to grip the edges of said strip.

8. Apparatus as set forth in claim 7 in which said clamping frames are disposed on opposite sides of said lengthing means, and means is provided to move said frames in diverging paths.

9. Apparatus for treating a plastic strip which comprises means to feed said strip continuously along a longitudinal path of travel, lengthening means including a plurality of pulling elements positioned along said longitudinal path of travel alternately above and below said path of travel at correspondingly alternate levels transversely spaced from said path of travel for engaging correspondingly the opposite faces of said strip to lengthen said strip by stretching said strip continuously out of its normal plane in a first direction transverse to said path of travel, and separate widening means movable in laterally diverging paths at the corresponding opposite edges of said strip and positioned along said longitudinal path of travel at least in part coextensively with said lengthening means therealong and operative simultaneously with said lengthening means to widen said strip in a second direction transverse to said longitudinal path of travel simultaneously with the lengthening thereof, during the feeding of said strip continuously along said path of travel.

References Cited by the Examiner

UNITED STATES PATENTS

| 2,473,404 | 6/49 | Young | 18—1 |
| 2,560,038 | 7/51 | Trainer | 264—93 |
| 2,728,941 | 1/56 | Alles et al. | 18—1 |
| 2,923,966 | 2/60 | Tooke et al. | 18—1 |
| 2,961,711 | 11/60 | Diedrich et al. | 18—48 |
| 3,007,204 | 11/61 | Veiel et al. | 18—48 |

MICHAEL V. BRINDISI, *Primary Examiner.*